United States Patent [19]

Matsumoto

[11] Patent Number: 5,178,026
[45] Date of Patent: Jan. 12, 1993

[54] DAMPER DEVICE FOR MOTOR

[75] Inventor: Tsutomu Matsumoto, Takefu, Japan

[73] Assignee: Matsushita Electric Industrial Co., Ltd., Osaka, Japan

[21] Appl. No.: 756,583

[22] Filed: Sep. 9, 1991

[30] Foreign Application Priority Data

Oct. 26, 1990 [JP] Japan .................. 2-288692

[51] Int. Cl.⁵ .................. F16D 3/68; F16H 55/14
[52] U.S. Cl. .................. 74/411; 74/425; 464/73
[58] Field of Search .............. 74/411, 425, 89.14; 464/73, 92

[56] References Cited

U.S. PATENT DOCUMENTS

| | | | |
|---|---|---|---|
| 3,443,449 | 5/1969 | Kotarski | 74/411 X |
| 3,554,045 | 1/1971 | Littmann | 74/411 |
| 4,748,865 | 6/1988 | Umezawa et al. | 74/411 |
| 4,899,608 | 2/1990 | Knappe et al. | 464/73 X |

FOREIGN PATENT DOCUMENTS

| | | |
|---|---|---|
| 2809167 | 9/1979 | Fed. Rep. of Germany ........ 74/411 |
| 1353418 | 5/1974 | United Kingdom . |
| 1393648 | 5/1975 | United Kingdom . |
| 1498401 | 1/1978 | United Kingdom . |
| 2008718 | 6/1979 | United Kingdom . |

Primary Examiner—Allan D. Herrmann
Attorney, Agent, or Firm—Stevens, Davis, Miller & Mosher

[57] ABSTRACT

A damper device for a motor includes a worm wheel meshingly engaged with a worm on a motor shaft. The worm wheel has a tubular flange in which a plurality of recesses are formed. A rotatable torque transmission disk is connected to an output shaft for rotation therewith. The torque transmission disk has a plurality of radial protrusions formed on an outer periphery thereof. A resilient damper/coupling member is interposed between the worm wheel and the torque transmission disk so as to transmit a torque of the motor to the output shaft. The protrusions of the torque transmission disk are loosely fitted respectively in the recesses in the flange of the worm wheel. With this construction, when a large load is applied to the output shaft, the protrusions are abutted respectively against the edges of the recesses, thereby preventing an undue deformation or twisting of the damper/coupling member.

1 Claim, 2 Drawing Sheets

DAMPER DEVICE FOR MOTOR

BACKGROUND OF THE INVENTION

This invention relates to a damper device for a motor used, for example, in a power window of an automobile.

Recently, with an increasing tendency for people to wish high-class cars (particularly, passenger cars), an increased percentage of cars have now been equipped with power windows, and therefore an increased number of motors have been used. When a switch of the power window is kept turned on, a window glass pane moves upward or downward, and when it comes into contact with a window frame, the motor is forcibly stopped. At this time, the motor as well as a speed reducer is subjected to an impact and therefore a damper or buffer device is incorporated so as to dampen such an impact to thereby prevent the breakage of the speed reducer.

A conventional motor damper device includes a worm wheel of a synthetic resin, a torque transmission plate or disk of stainless steel, and a damper/coupling member of rubber interposed between the worm wheel and the torque transmission disk, through which the worm wheel is coupled to the torque transmission disk. The worm wheel is operatively connected to the motor. The torque transmission disk is operatively connected to an output shaft for moving a window glass pane upward or downward.

When the window glass pane comes into contact with the window frame, the rotation of the output shaft is forcibly stopped, but at this moment the motor is still rotating, and therefore an impact force develops in the device.

At this time, the damper/coupling member is elastically deformed or twisted to absorb the impact, thereby preventing the tooth of the worm wheel from breakage.

With the above conventional construction, however, when a large load due to some external factor is applied to the window glass pane, a large twisting force is exerted on the damper/coupling member, so that the engagement between the torque transmission disk and the damper/coupling member and the engagement between the worm wheel and the damper/coupling member are released. Therefore the worm wheel idles, which results in a failure to open and close the window glass pane. There is also a drawback that the locking becomes ineffective, so that the window glass pane can be manually opened from the exterior.

SUMMARY OF THE INVENTION

With the above problems of the prior art in view, it is an object of this invention to provide a damper device for a motor which prevents the idling of the worm wheel.

According to the present invention there is provided a damper device for a motor comprising a resilient damper/coupling member, a worm wheel operatively connectable to the motor, a tubular member fixed at one end thereof to one end face of the worm wheel for receiving therein the resilient damper/coupling member, a plurality of recesses provided at an outer periphery of the other end of the tubular member, a torque transmission disk operatively connected to an output shaft, which torque transmission disk is coupled with the worm wheel through the resilient damper/coupling member, and a plurality of protrusions projecting radially outward from a periphery of the torque transmission disk, which are loosely received within the recesses.

The engagement between the protrusions and the recesses prevents the damper/coupling member from being deformed or twisted beyond a predetermined angle.

With the above construction, in a normal condition in which a window glass pane is operated by the energization of the motor, the damper/coupling member is not twisted to such an extent as to allow an abutment of the protrusion of the torque transmission disk with the recess in the worm wheel. In an abnormal condition in which the load on the window glass pane is unduly large, the protrusions engage with the recesses to prevent the damper/coupling member from being twisted beyond the predetermined angle. Therefore, the worm wheel will not become disengaged from the damper/coupling member, thereby preventing the idling of the worm wheel.

DESCRIPTION OF THE PREFERRED EMBODIMENT

Figure 1:
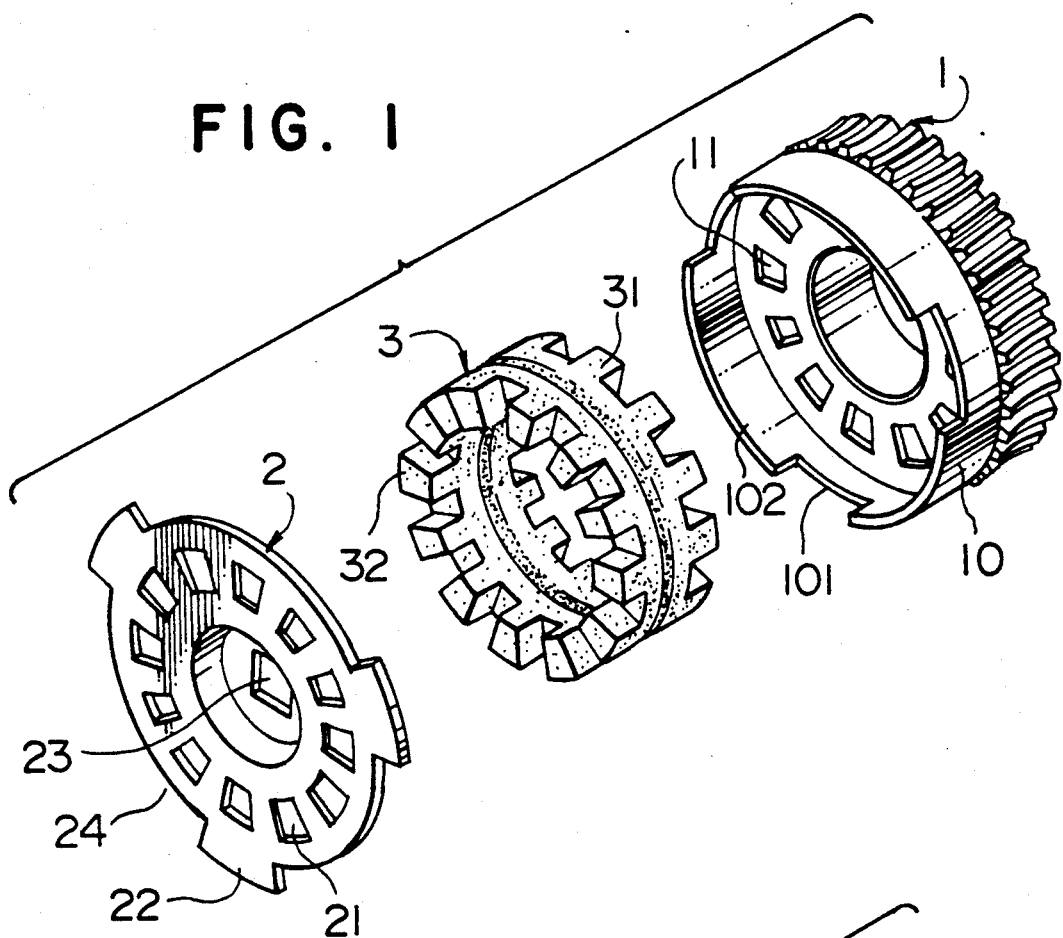
FIG. 1 is an exploded perspective view showing a damper device of the present invention.
Figure 2:
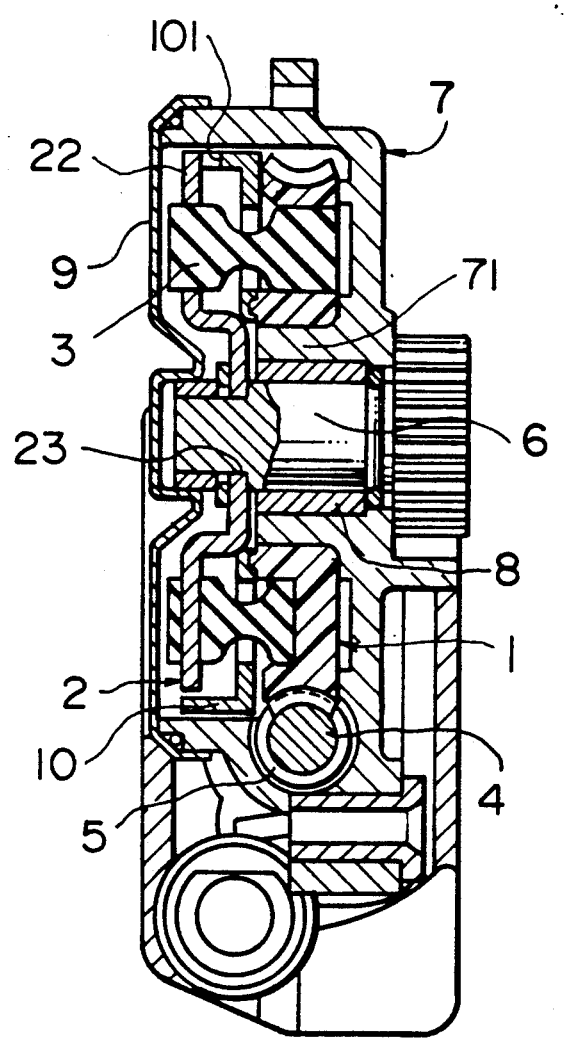
FIG. 2 is a cross-sectional view of the damper device of FIG. 1 equipped on a motor.

Referring to FIGS. 1 and 2, a motor damper device according to one embodiment of the present invention includes an annular worm wheel 1 of a synthetic resin, a torque transmission plate or disk 2 of stainless steel, and an annular damper/coupling member 3 of rubber interposed between the worm wheel 1 and the torque transmission disk 2 through which the worm wheel 1 is coupled to the torque transmission disk 2. The worm wheel 1 is operatively connected to a motor shaft 4 through a worm 5. The torque transmission disk 2 is operatively connected to an output shaft 6 for moving a window glass pane upward or downward.

The worm wheel 1 is provided with a plurality of square holes 11 which are disposed circumferentially. A tubular metal flange 10 projects axially from a periphery of the worm wheel 1. Three recesses 101 are provided at an outer periphery of an end of the flange 10. These recesses 101 are spaced equiangularly and each of them extends angularly by a first angle, e.g. 90°.

The torque transmission disk 2 is also provided with a plurality of square holes 21 which are disposed circumferentially. Further three protrusions 22 project radially outward from a periphery of the disk 2. Three protrusions 22 are spaced equiangularly. Each of them extends angularly by a second angle which is smaller than the first angle, e.g. 30°, thereby being loosely received within the recesses 101.

In other words, three protrusions 102 provided in the flange 10 are loosely received within the recesses 24 defined between adjacent two protrusions 22 and 22 of the disk 2.

The damper/coupling member 3 is provided at opposite end faces thereof with a plurality of axial projections 31 and 32. These projections 31 and 32 are aligned with the respective holes 11 and 21. The shapes of the projections 31 and 32 are complementary to the shapes of the holes 11 and 21, respectively.

A cup-shaped gear casing 7 is provided with a boss portion 71. The worm wheel 1 is mounted on the boss portion 71 and housed within the gear casing 7. The disk 2 and the damper/coupling member 3 are assembled together and then coupled with the worm wheel 1. A cover 9 is attached to the gear casing 7 by caulking so as to close an opening of the gear casing 7. The output shaft 6 is rotatably mounted in the boss 71 of the gear casing 7 through a metal bearing 8. A square hole 23 is provided at a centre of the disk 2, into which an end of the output shaft 6 is fixed.

An operation of the motor damper device described above will be explained hereinunder.

When a motor is driven, a rotation of the motor is transmitted in a reduced manner to the worm wheel 1 through the motor shaft 4 and the worm 5. Then, a torque of the motor is transmitted to the output shaft through the damper/coupling member 3. The output shaft 6 operates a regulator equipped in a car door so as to open or close the window glass pane.

An impact force of an ordinary level when the window glass pane comes into contact with the window frame is absorbed due to a twisting or a deformation of the resilient damper/coupling member 3. Namely, the damper/coupling member has such a hardness that when a window glass pane of an automobile is completely closed or opened, the damper/coupling member 4 is twisted by an angle of not more than 30°. In an abnormal condition, that is, when a large load is applied to the window glass pane, the angle of twisting of the damper/coupling member 4 becomes more than 30°. However, in such a case, the edges of the recesses 101 in the flange 10 are abutted against the edges of the protorusions 22 of the torque transmission disk 2. Therefore, the damper/coupling member 3 will not be further twisted.

According to this, the damper/coupling member 3 is prevented from being disengaged from the worm wheel 1 and the torque transmission disk 2.

Figure 3:
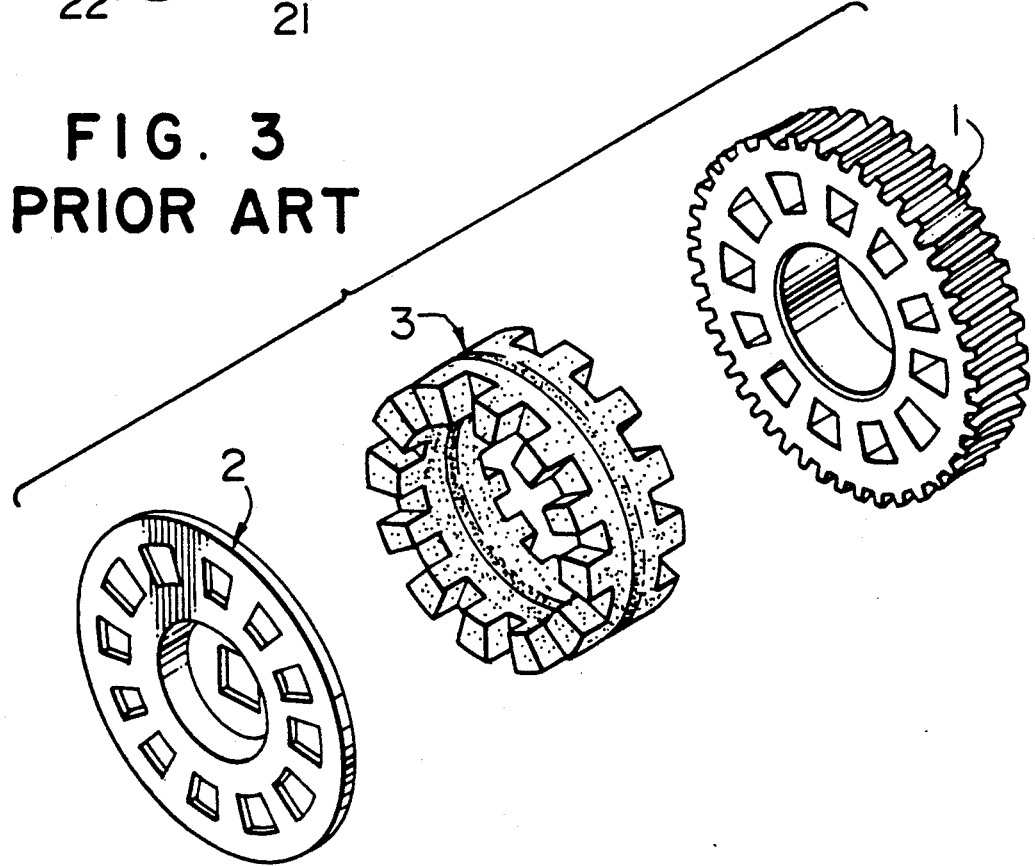
FIG. 3 is an exploded perspective view showing a conventional damper device.

To the contrary, in the conventional construction shown in FIG. 3, since there is neither the recess of the flange of the worm wheel 1 nor the protorusions of the torque transmission disk 2, if a large load is applied to the window glass pane, the damper/coupling 3 may be deformed beyond the predetermined angle to disengage the torque transmission disk 2 from the worm wheel 1.

What is claimed is:

1. A damper device for a motor comprising:
    a resilient damper/coupling member;
    a worm wheel operatively to be connected to the motor;
    a tubular member fixed at one end thereof to one end face of said worm wheel for receiving therein said resilient damper/coupling member;
    a plurality of recesses provided at an outer periphery of the other end of said tubular member;
    a torque transmission disk to be operatively connected to an output shaft, said torque transmission disk being coupled with said worm wheel through said resilient damper/coupling member; and
    a plurality of protrusions projecting radially outward from a periphery of said torque transmission disk, said protrusions being loosely received within said recesses.

* * * * *